Nov. 9, 1965  D. GOLDSTEIN  3,216,560
COMBINATION SHIPPING CONTAINER AND DISPLAY DEVICE
Original Filed Nov. 12, 1959  9 Sheets-Sheet 1

INVENTOR.
DANIEL GOLDSTEIN
BY Blum Moscovitz, Friedman
Blum + Kaplan
ATTORNEYS

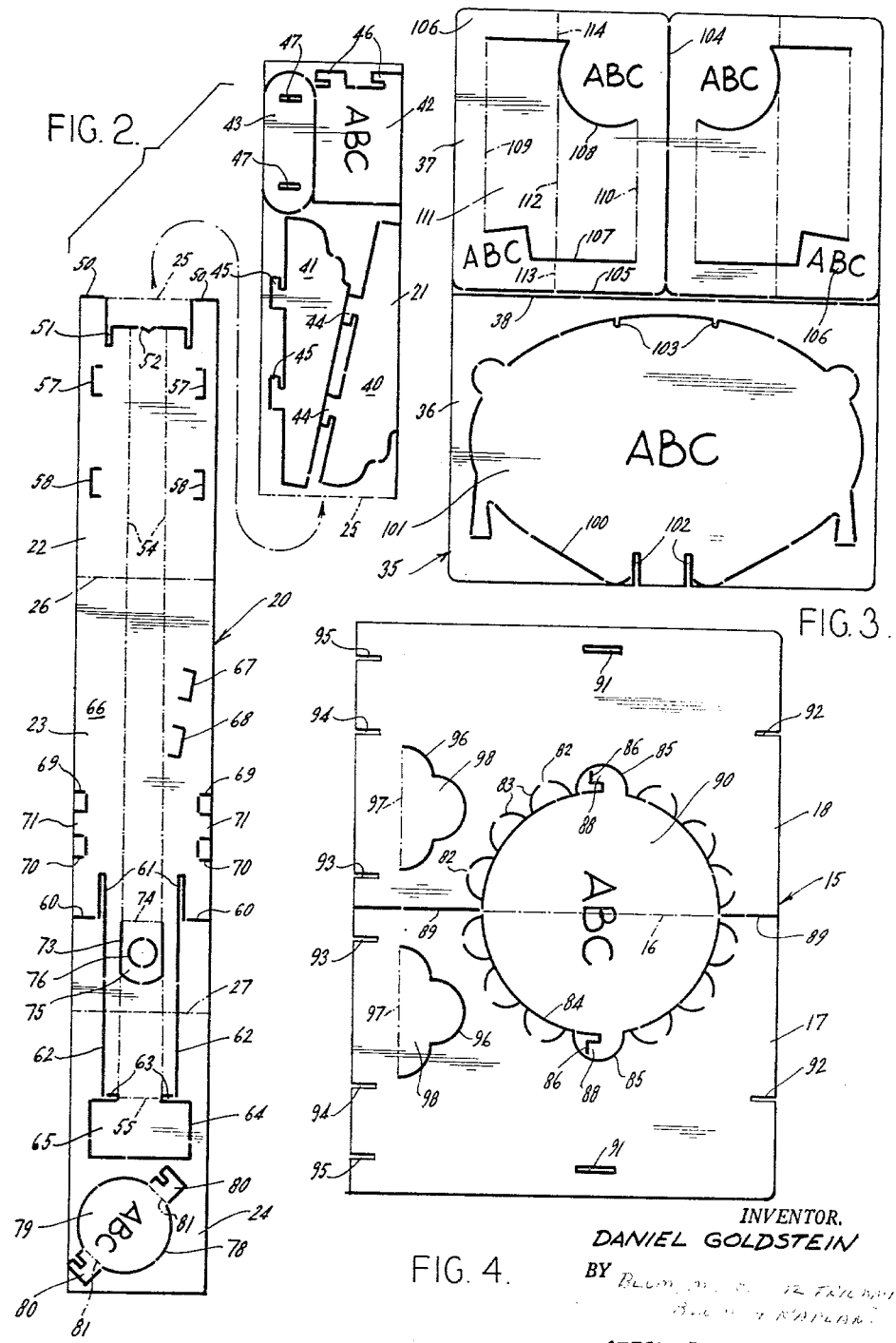

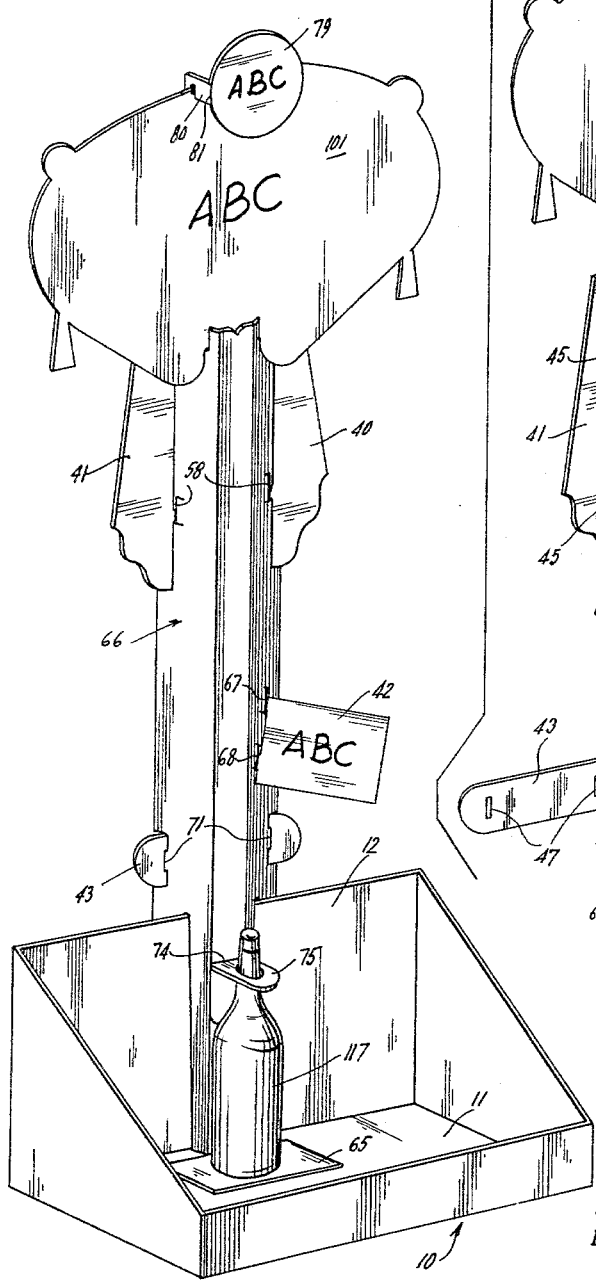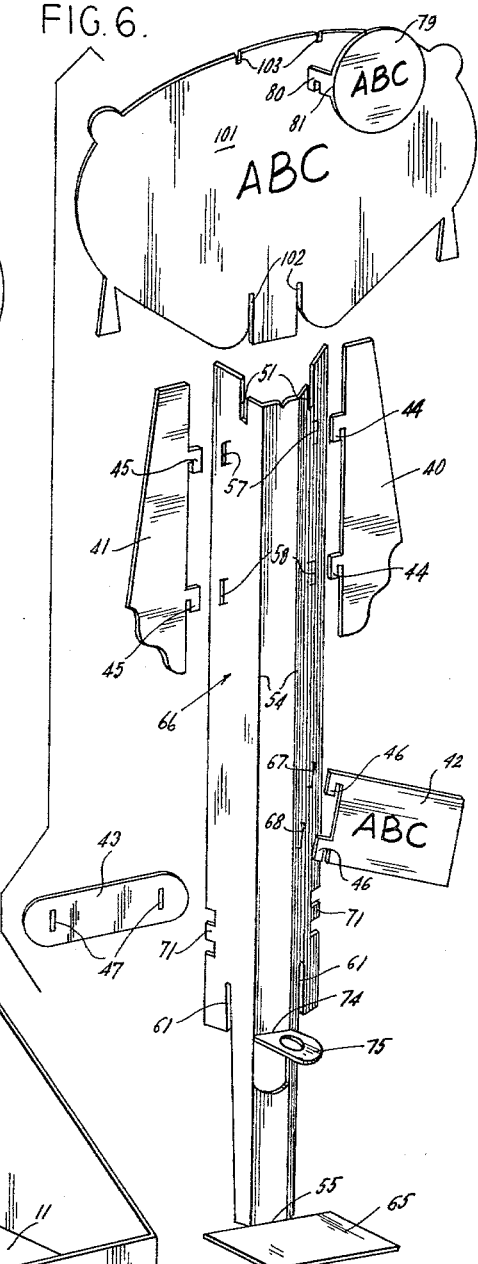

Nov. 9, 1965     D. GOLDSTEIN     3,216,560
COMBINATION SHIPPING CONTAINER AND DISPLAY DEVICE
Original Filed Nov. 12, 1959     9 Sheets-Sheet 4

INVENTOR.
DANIEL GOLDSTEIN
BY
ATTORNEYS

Nov. 9, 1965  D. GOLDSTEIN  3,216,560
COMBINATION SHIPPING CONTAINER AND DISPLAY DEVICE
Original Filed Nov. 12, 1959  9 Sheets-Sheet 5

INVENTOR.
DANIEL GOLDSTEIN
BY
ATTORNEYS

Nov. 9, 1965    D. GOLDSTEIN    3,216,560
COMBINATION SHIPPING CONTAINER AND DISPLAY DEVICE
Original Filed Nov. 12, 1959    9 Sheets-Sheet 6
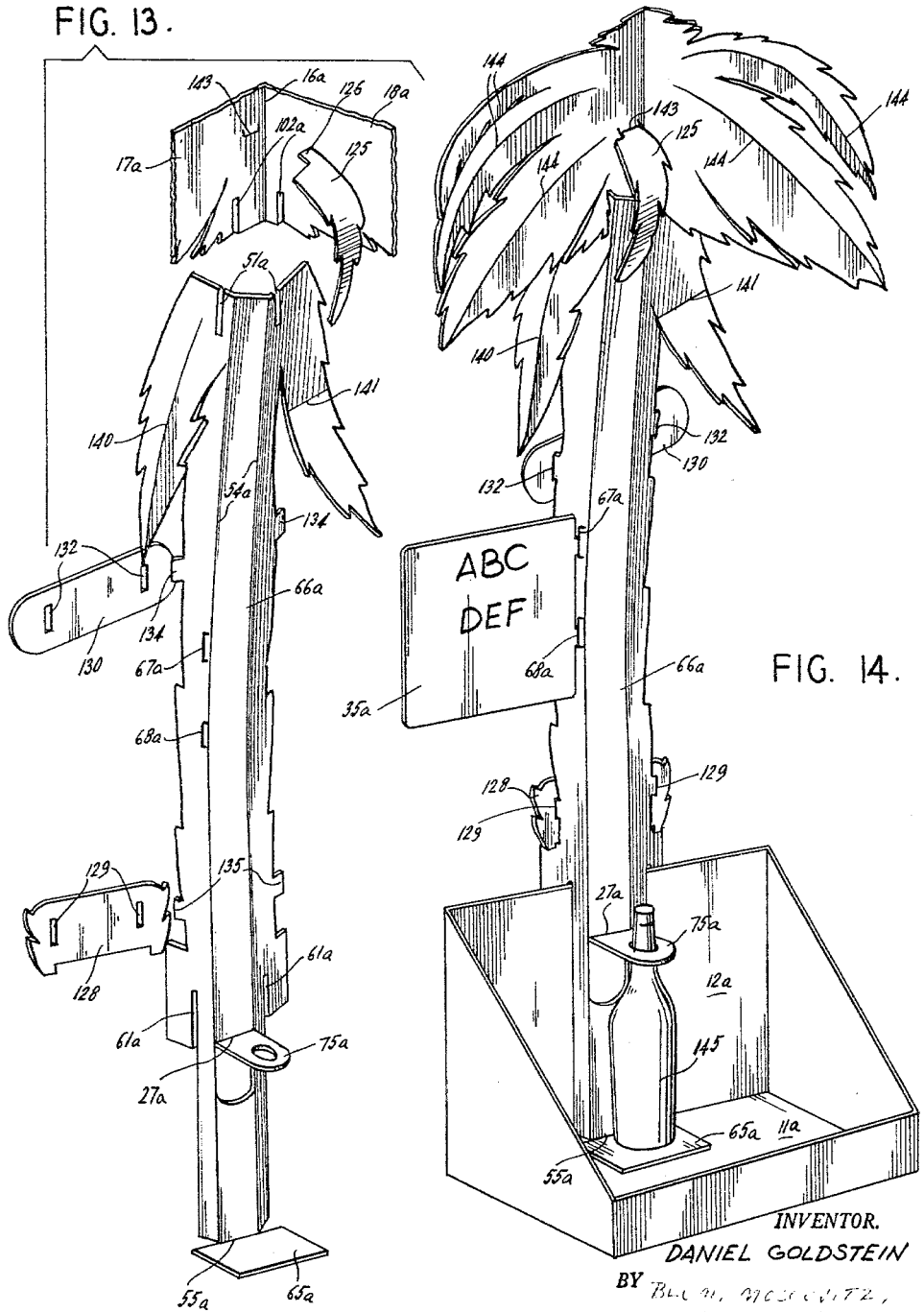

Nov. 9, 1965 D. GOLDSTEIN 3,216,560
COMBINATION SHIPPING CONTAINER AND DISPLAY DEVICE
Original Filed Nov. 12, 1959 9 Sheets-Sheet 7
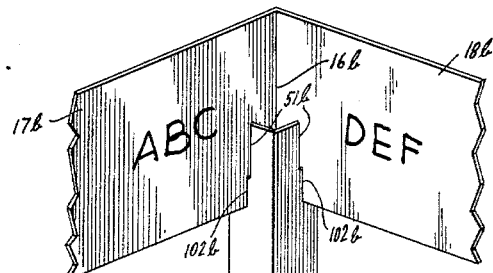
FIG. 17.
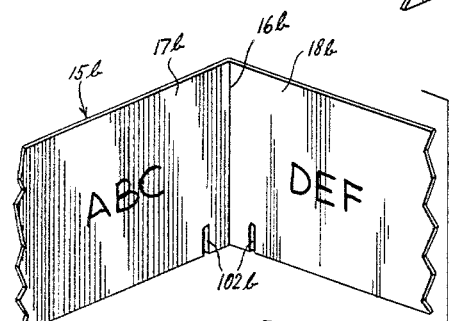
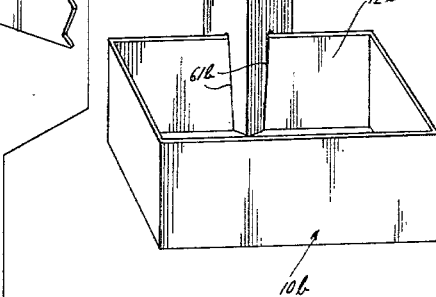
FIG. 16.
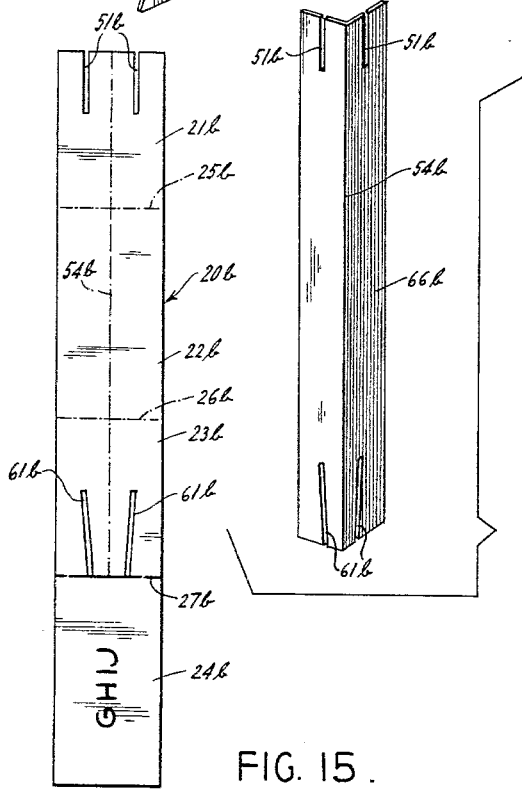
FIG. 15.
INVENTOR.
DANIEL GOLDSTEIN
BY
ATTORNEYS

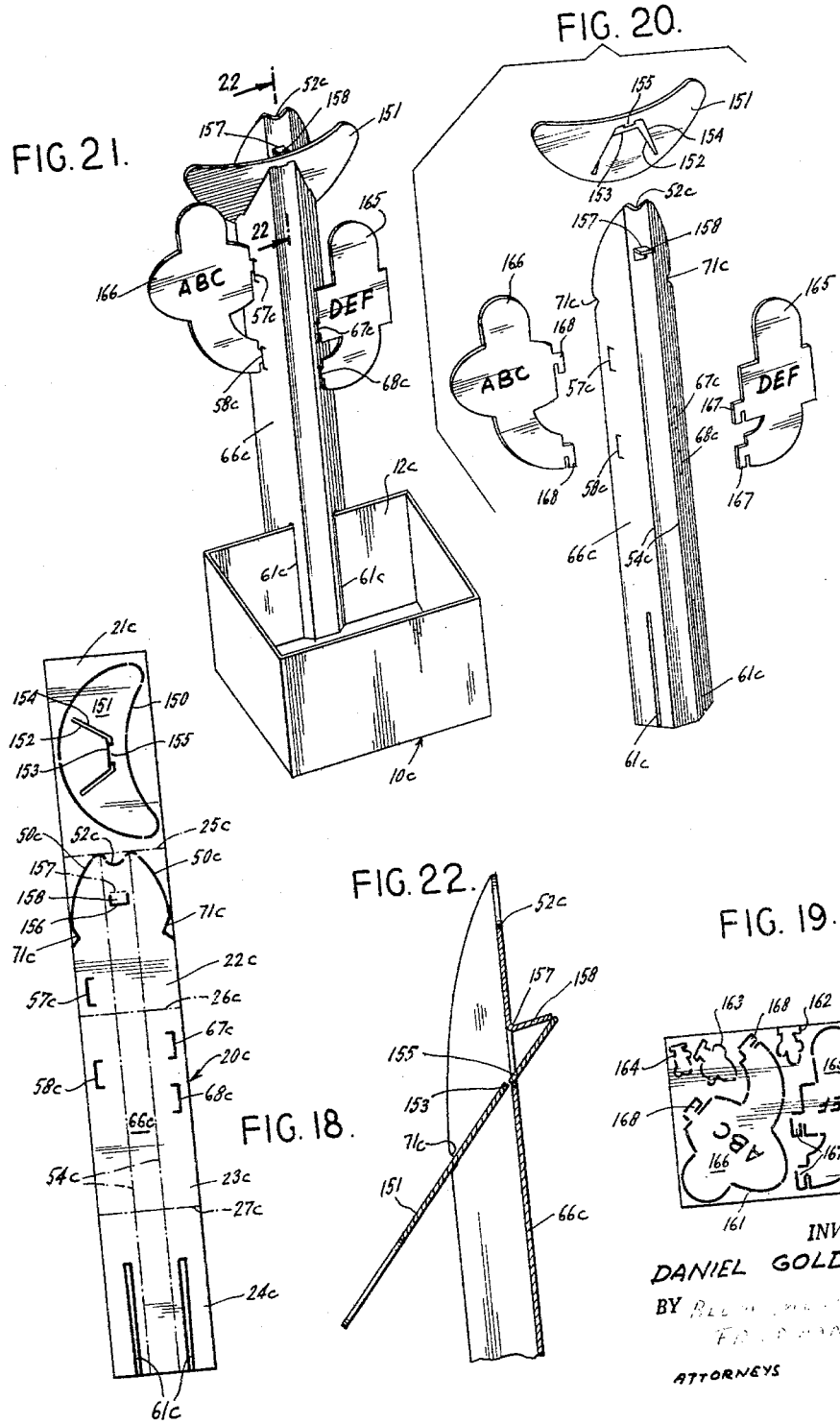

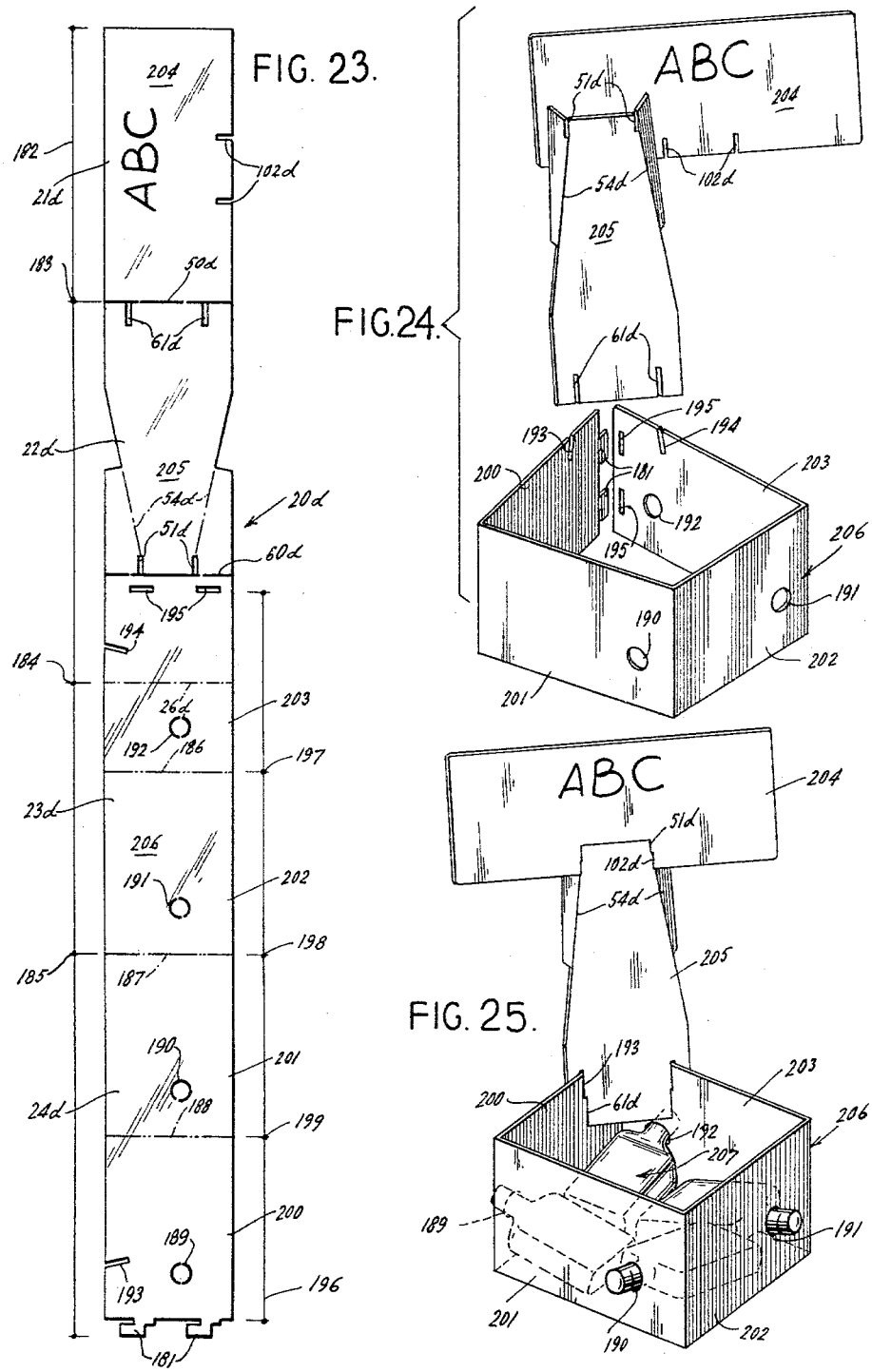

United States Patent Office 3,216,560
Patented Nov. 9, 1965

3,216,560
COMBINATION SHIPPING CONTAINER AND DISPLAY DEVICE
Daniel Goldstein, New York, N.Y., assignor to Schenley Industries, Inc., New York, N.Y., a corporation of Delaware
Original application Nov. 12, 1959, Ser. No. 852,495. Divided and this application Feb. 14, 1964, Ser. No. 344,909
10 Claims. (Cl. 206—44)

This invention relates generally to a marketing device, and is especially concerned with a marketing device adapted to serve both as a shipping container for goods and as a display for the shipped goods. This application is a divisional application of my application Serial No. 852,495, filed November 12, 1959, for Combination Shipping Container and Display Device.

While the device of the present invention has been primarily developed and employed for use in the marketing of bottled goods, and will be illustrated and described hereinafter with particular reference thereto, it is appreciated that the various novel features of the instant invention are capable of many varied applications, all of which are intended to be comprehended herein. For example, a shipping container and display device of the invention may be employed in conjunction with cans, tubes, boxes and jars of all sizes.

It is a general object of the present invention to provide a marketing device which is admirably well suited for service both as a shipping container and a display for the shipped goods, being entirely protective of the goods in transit, and capable of attractive and attention-gaining display of the goods, at the point of sale.

It is another object of the present invention to provide a marketing device of the type described wherein a protecting liner is uniquely cooperable with remaining structure of the device, including the container, cell structure and protecting pads, to provide a remarkably large and attractive display at a minimum of cost, both in manufacture and transportation.

It is a further object of the present invention to provide a marketing device having the advantageous characteristics mentioned in the preceding paragraphs which may very quickly and easily be transformed from its original, transit condition to perform its advertising and merchandising display function, even by unskilled persons and with little or no instruction.

Other objects of the present invention will become apparent upon reading the following specification and referring to the accompanying drawings, which form a material part of this disclosure.

The invention accordingly consists in the features of construction, combination of elements, and arrangements of parts, which will be exemplified in the constructions hereinafter described, and of which the scope will be indicated by the appended claims.

In the drawings:

FIG. 2 is a plan view showing in greater detail the liner of the device of FIG. 1, with a part thereof transpositioned for economy of drawing space without loss of detail.

FIG. 3 is a plan view showing in greater detail a protecting pad of the device of FIG. 1.

FIG. 4 is a plan view showing in greater detail another protecting pad of the device of FIG. 1.

FIG. 6 is an exploded perspective view showing various pieces formed from the liner of FIG. 2, and part of the pad of FIG. 3 in an about to be assembled condition.

FIG. 7 is a perspective view showing the elements of FIG. 6 in assembled relation, together with a container and a bottle.

FIG. 13 is an exploded perspective view showing separate parts formed from the liner of FIG. 10 and pad of FIG. 11 in an about to be assembled condition.

FIG. 14 is a perspective view showing the elements of FIG. 13, together with the pad of FIG. 12, all in assembled relation, and associated with a container and bottle.

FIG. 15 is a plan view showing an additional embodiment of liner constructed in accordance with the teachings of the present invention.

FIG. 16 is an exploded perspective view showing the liner of FIG. 15 in an about to be assembled relation with respect to a protecting pad.

FIG. 17 is a perspective view showing the elements of FIG. 16 in assembled condition, and associated with a container.

FIG. 18 is a plan view showing an additional slightly modified form of liner constructed in accordance with the present invention.

FIG. 19 is a plan view showing a modified form of protecting pad adapted for use in conjunction with the liner of FIG. 18.

FIG. 20 is an exploded perspective view showing separate pieces formed from the liner and protecting pad of FIGS. 18 and 19 in an about to be assembled condition.

FIG. 21 is a perspective view showing the elements of FIG. 20 in their assembled relation, together with a container.

FIG. 22 is an enlarged, fragmentary sectional view taken substantially along the line 22—22 of FIG. 21.

FIG. 23 is a plan view showing an additional embodiment of container liner constructed according to the teachings of the present invention.

FIG. 24 is a perspective view showing separate elements formed from the liner of FIG. 23 in an about to be assembled condition, and FIG. 25 is a perspective view showing the elements of FIG. 24 in their assembled display condition of use.

Figure 1:
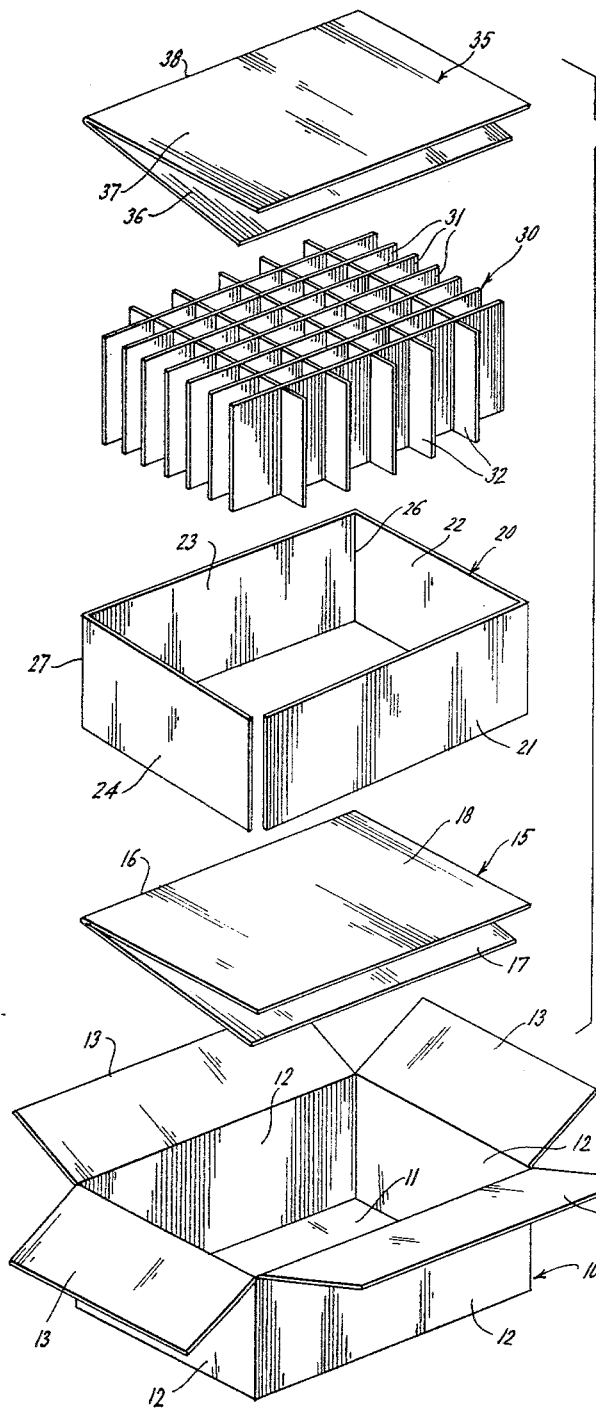
FIG. 1 is an exploded perspective view showing one form of a marketing device of the present invention in its original or shipping condition.

Referring now more particularly to the drawings, and specifically to FIG. 1 thereof, a container is there generally designated 10 and may be of conventional, rectangular hexahedral configuration. Thus, the container 10 may include a bottom wall 11, upstanding peripherally extending side walls 12 on the bottom wall, and top flaps 13 on the upper edges of the side walls closable to define a top wall.

A lower or bottom protecting pad 15 is adapted to rest on the bottom container wall 11 within the container. In the illustrated embodiment the protecting pad 15 is formed with a center line fold or hinge 16 so as to be of double thickness and define a pair of substantially equal size facing panels 17 and 18.

Adapted to be located interiorly of the container 10, extending entirely along the peripheral side walls 12 is a liner 20. The liner may include four generally rectangular sections 21, 33, 23 and 24 arranged in end to end relation and hingedly connected together at their adjacent ends, as by fold lines 25, 26 and 27.

Adapted to rest on the lower or bottom protecting pad 15, within the container 10 and surrounded by the liner 20 is a cell structure, generally designated 30. The cell structure may include a group of generally parallel, longer separators or dividers 31, and a second group of generally parallel, shorter separators or dividers 32, which latter group extends transversely of or normal to the separators 31 of the first-mentioned group. Further, the separators or dividers 32 intersect with the separators or dividers 31; and, each of the separators is preferably provided with suitable formations for interfitting engagement with all of the separators of the other group.

An additional, upper or top protecting pad 35 may be superposed over the cell structure 30, within the container 10, and may consist of a pair of panels 36 and 37 arranged in facing, superposed relation, and hingedly connected together, as by a fold line 38.

While all of the elements or parts of FIG. 1 are preferably formed of corrugated cardboard, it is appreciated that any suitable stiff, bendable sheet material capable of being scored, perforated, punched out, severed or ruptured, may be employed, without departing from the invention.

In the following figures, the alphabetical indicia carried by the several elements, are of course, intended to represent advertising matter, which may in practice assume much more complete and elaborate form.

In FIG. 2 is shown in detail the liner 20, including the panels or sections 21, 22, 23 and 24 hingedly connected together by fold lines 25, 26 and 27. In FIG. 2, and subsequent views, the interrupted, bold or heavy lines represent interrupted cuts, while the dot-and-dash outlines represent creases, scores or fold lines.

Thus, the liner 20 is cut in its panel or section 21 to form four separate pieces 40, 41, 42 and 43. That is, the panel 21 is formed with interrupted cuts such that the pieces 40–43 may be severed from each other and the remainder of the panel. The pieces 40, 41 and 42 are each ornamental cards, and each provided or formed on one edge thereof with a pair of hook-shaped formations or tabs. That is, a pair of tabs or hooks 44 are formed on one edge of the piece 41. An additional pair of edge hooks or tabs 46 are formed on the piece or card 42.

The separable piece 43 may be of generally ovaloid configuration and is formed adjacent to its opposite ends with a pair of transversely extending, generally parallel slots or openings 47.

The liner panel or section 21 is severable from the remaining sections by an interrupted cut or line of perforations 50 extending laterally inward a short distance from each longitudinal edge of the liner along the fold 25, and thence into the liner section 22 to define a pair of slots 51 extending longitudinally of the liner and spaced laterally on opposite sides of the longitudinal center line of the liner. The interrupted cut 50 also extends laterally between the slots 51 in an ornamental configuration, as at 52, and located in the section 22 spaced inward from the fold 25. Thus, upon severance along the line 50, the pair of laterally spaced slots 51 are formed in the liner section 22, which slots open longitudinally outward toward the fold line 25 or severed end of the liner section.

A pair of generally parallel fold lines 54 are formed in the liner sections 22, 23 and 24, extending longitudinally thereof, spaced centrally between the side edges of the liner, and extending from the cut 50, between the slots 51, and entirely through the liner sections 22 and 23 and to an intermediate location in the liner section 24, there terminating in a fold line 55 extending laterally between the ends of the fold lines 54. The fold lines 54 thus intersect with the panel connecting fold lines 26 and 27.

A pair of longitudinally spaced, generally U-shaped cuts 57 and 58 are located in spaced relation between each side edge of the liner section 22 and the adjacent longitudinal fold line 54.

An interrupted cut 60 in the liner section 23 extends for a short distance laterally inward from each longitudinal side edge of the liner section, spaced longitudinally inward from the fold line 27, whence it extends further inward to define a pair of slots 61 on opposite sides of the pair of longitudinal fold lines 54, which slots extend longitudinally of the liner and each open at one end toward the fold line 27. From each of the slots 61, the cut 60 extends longitudinally of the liner, on opposite sides of the longitudinal fold lines 54 through and beyond the fold lines 27, as at 62, into the liner section 24. Extending laterally inward from the ends of the cuts 62 in the liner section 24 are cuts 63, each of which terminates at the intersection of fold line 54. From these intersections extends a generally rectangular cut 64, which combines with the fold line 55 to define a generally rectangular area of flap 65.

Formed in the liner section 23, between the fold line 26 and cut 60, and between one side edge of the liner and the adjacent longitudinal fold 54, are a pair of longitudinally spaced, generally C-shaped cuts 67 and 68. Also formed in the region of liner section 23 between the fold line 26 and cut 60, and adjacent to each longitudinal edge of the liner, are a pair of longitudinally spaced, generally C-shaped cuts 69 and 70, each of which at its ends at the adjacent longitudinal liner edge, so that the region within the respective cut is severable from the liner. Upon such severance, there remains between each pair of cuts 69 and 70 a laterally outstanding tab or tongue 71.

Formed in the liner section 23, between the longitudinally extending cut 60, is a generally U-shaped cut 73. Further, the U-shaped cut 73 has its legs coincident with laterally spaced portions of the fold lines 54, while its bight region extends laterally between the fold lines. An additional, laterally disposed fold line 74, extends between the fold lines 54, terminating at the distal ends of the cut 73, so as to define the region 75 bounded within the cut 73 and fold line 74 a flap swingable about the latter fold line. A generally circular cut 76 of closed configuration is formed in the flap region 75, and the area bounded within the cut 76 removable by rupture or severance along the cut to define an aperture.

In the region of liner section 24 between the cut 64 defining the flap 65, and the distal end of the liner, there is formed a generally circular cut 78 defining a generally circular portion 79 having a pair of diametrically opposed outstanding hooks or tabs 80 connected to the circular portion by fold lines 81.

The bottom protecting pad 15 is shown in detail in FIG. 4, as including a pair of substantially identical, rectangular panels 17 and 18 hingedly connected together for swinging movement about the fold line 16. Viewed otherwise, the bottom pad 15 may be considered as a single panel or sheet having the fold 16 provided along its center line to form the hingedly connected panels 17 and 18. A generally circular interrupted cut 84 is formed in the panels 17 and 18 symmetrically about the fold line 16, the latter being along a diameter of the cut. Exteriorly of the cut 84 in each panel 17 and 18 is formed a generally semicircular cut 85 at opposite ends of a diameter generally normal to that of the fold line 16; and, interiorly of each cut region 85 is formed an additional cut 86 which combines with the adjacent cut 85 to define a hook or tab 88.

Also formed in the panels 17 and 18 exteriorly of the circular cut 84 and extending therealong are a plurality of generally semicircular interrupted cuts 83 arranged in the manner of scallops. In particular, each semicircular scallop cut 83 may be interrupted in a medial region remote from the circular cut 84, as at 82. Extending along and coincident with the fold line 16, from the circular cut 84 to each of the oppoite panel edges is a cut 89. Hence, the panels 17 and 18 are separable from each other along the cut 89 and the circular cut 84, and further, the region 90 within the circular cut 84 is severable from each of the panels, so that the bottom pad is adapted to form three separate pieces. That is, the region 90, including the hooks 88 defined within the cuts 85, is separable from the panels 17 and 18 along the interrupted cut 84; and, the generally semicircular regions within the scalloped cuts 83 may be deflected rearward, as at their attachment portions 82, in the manner disclosed in FIGS. 8 and 9, for enhanced esthetic effect.

The panels 17 and 18 are each provided with a slot 91 extending generally parallel to the fold line 16 and located remote from the latter fold line in substantial alignment with each other and the semicircular cuts 85. Also, each panel 17 and 18 is formed with a slot 92 extending generally parallel to the fold line 16 and entering inward from one edge of the respective panel medially between the fold line 16 and the panel edge remote from the fold line. A plurality of slots 93, 94 and 95 all extending generally parallel to the fold line 16 inward from the panel edge opposite to that having the slot 92. Adjacent to the edge of each panel 17 and 18 having the slots 93, 94 and 95 is formed a cut 96 terminating at a pair of free ends extending toward and spaced from the respective panel edge having the slots 93, 94 and 95. A fold line 97 extends between the free ends of each cut 96, so that the fold line and cut combine to define in the panel region therewithin a flap 98 swingable out of the plane of the respective panel about the respective fold line 97.

The top pad 35 is shown in detail in FIG. 3, as formed of a generally rectangular sheet having an interrupted cut 38 defining a fold line and extending along the center line of the sheet to subdivide the latter into a pair of substantially equal size, generally rectangular panels 36 and 37.

The panel 36 is formed with an interrupted cut 100 of closed outline configuration defining a card 101 having a pair of alternately spaced, symmetrically arranged slots 102 opening outward through the lower edge, as seen in FIG. 3. Also, a pair of symmetrically laterally spaced notches or slots 103 are defined by the cut 100 and the card 101 to open outwardly therefrom opposite to the slots 102. The card 101 is, of course, entirely separable from the panel 36 of the top pad 35.

The panel 37 of the top pad is formed with a cut 104 extending generally normal to and toward the midpoint of the cut or fold line 38. In addition, a cut 105 extends closely parallel to the fold line 38, and is curved to merge smoothly with the cut 104 and the opposite edges of the panel 37. Thus, by severance of the cuts 104 and 105, the panel 37 is subdivided into a pair of substantially equal area sheets or pieces 106. Each of the pieces 106 is formed with a pair of lower and upper cuts 107 and 108, as viewed in FIG. 3, which cuts may be of any suitable configuration. A pair of fold lines 109 and 110 are formed in each piece 106, substantially parallel to the cut 104, and each extending between an adjacent pair of ends of the cuts 107 and 108. Further, the region 111 of each sheet 106 defined within the cuts 107 and 108, and fold lines 109 and 110, is formed with a fold line 112 extending substantially parallel to and located in spaced relation between the fold lines 109 and 110, and terminating at its opposite ends at the cuts 107 and 108. The region of each sheet 106 exteriorly of the region 111 is formed with a pair of fold lines 113 and 114 which may be in substantial end to end alignment with the opposite ends of the fold line 112, and respectively extend from the cuts 107 and 108 to the adjacent edges of the sheet.

Figure 5:
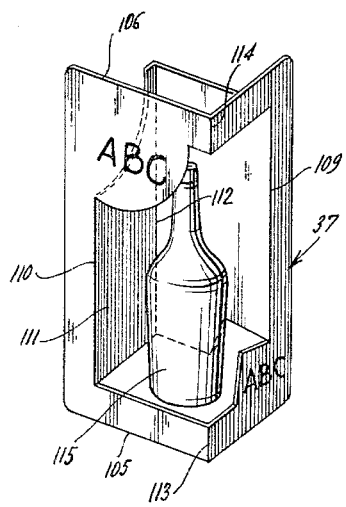
FIG. 5 is a perspective view illustrating the display condition of one element of the protecting pad of FIG. 3.

In FIG. 5 is shown one of the pieces 106 after having been separated from the remainder of top pad 35, and converted to its display condition. It will there be observed that the region 111 defines with the cuts 107 and 108 and fold lines 109 and 110 has been displaced rearward of the remaining region by bending or folding along the fold lines 109, 110, 112, 113 and 114, to define an attractive setting for receiving a bottle 115. Of course, both pieces 106 may be similarly transformed to provide attractive merchandise displays.

The remainder of the top pad 35, and the liner 20 have been severed along their cuts to separate the various pieces thereof, and folding along their fold lines in the proper manner, to form the several pieces shown in FIG. 6. Hence, the region 66 of the liner 20 between the cuts 59 and 60 has been separated from the liner, and folded along its longitudinal rigidifying folds 54. The portion between the folds 54 is forward, while the portions between each side edge of the liner and the adjacent fold 54 extend obliquely rearward. It is thus understood that the linear region 66 serves in its display condition as a standard or upright. The lower end flap 65 defined within the cut 64 is swung forward about the fold line 55 to a generally horizontal position, while the flap or tab 75 is swung forward about its fold line 74, also to a generally horizontal position directly over the lower end flaps.

The pieces 40 and 41, as well as 42 and 43 are shown in their severed or separate condition. Also, the piece 101 formed from the top pad 35, and the piece 79 formed from the liner section 24, are illustrated in their severed, separate conditions.

Of course, it is understood that the top and bottom pads may be interchanged, or both serve as top or bottom pads, as desired.

The final assembly of the pieces in their display condition is shown in FIG. 7. It will there be observed that the piece 43 forms a brace or strap extending laterally behind the standard or upright piece 66, in interengagement therewith, being received in the notches or cut out regions defined by the cuts 69 and 70, and in turn receiving the tabs or tongues 71 in the slots 47, respectively. The pieces 40 and 41 are supported alongside of and adjacent to the upper end of the standard piece 66 by engagement of their hooks or tabs 44 and 45 inward through a respective pair of openings defined by the C-shaped cuts 57 and 58. That is, the C-shaped regions defined by the cuts 57 and 58 are resiliently deflectable outward for snug fitting reception therewith of the hooks 44 and 45. Similarly, the card 42 is carried by the standard piece 66 by resilient outward deflection of the cut regions 67 and 68 and engagement of the hooks or tabs 46 inward through the cut regions.

The piece 101 from the panel 36 of top pad 35 is arranged over the upper end of the standard piece 66, and moved downward to effect interengagement between the upwardly opening slots 51 of the standard and the downwardly opening slots 102 of the card 101. This effectively supports the card in elevated condition on the upper end of the standard, while maintaining the standard in its angulately folded condition.

The generally circular piece 79 may be supported on the upper region of the card 101 by interengagement of the hooks 80 with the upwardly facing slots 103 of the card.

The standard 66 and the additional parts or pieces carried thereby may all be supported by means of the container 10, which may be cut to remove the upper container flaps 13 and portions of the side walls 12, as illustrated in FIG. 7, to afford increased visibility to the contents of the container. In this condition, the downwardly opening slots 61 of the standard 66 may be engaged over and receive an upper edge region of a container wall 12, with the lower end flap 65 seated on the bottom container wall 11. A bottle 117 may be placed on the lower end flap 65 with its neck extending upward through the apertured flap 75 to lock the standard in display position. This affords firm and foolproof mounting for the standard 66 and the parts carried thereby.

Figure 8:
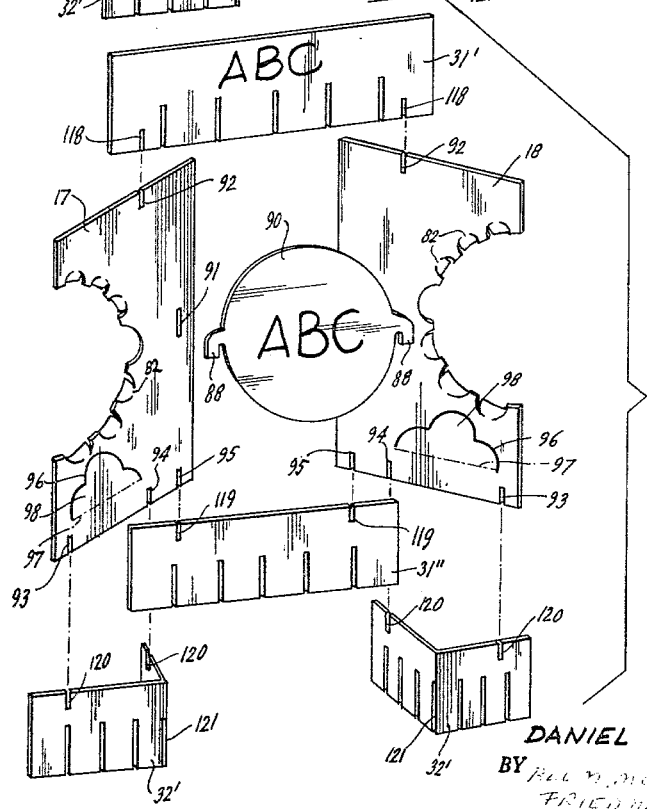
FIG. 8 is an exploded perspective view showing separate pieces formed from the pad of FIG. 4 and separators from FIG. 1, in an about to be assembled condition.

In FIG. 8 is shown the generally circular center-piece 90 of the bottom pad 15, removed therefrom, and the remaining regions of the panels 17 and 18 separated from each other and from the piece 90. The remaining regions of panels 17 and 18 have been reversed to locate their previously distal edges in proximate relation adjacent to the centerpiece 90. Also shown are certain of the longer separators 31, herein designated 31' and 31'', and certain of the shorter separators 32, herein designated 32'. It may be observed that the separator 31' is formed adjacent to opposite ends with a pair of slots 118 extending laterally inward through one side edge of the separator, while the separator 31'' is also formed with a pair of slots 119 laterally extending inward from one side edge of the latter separator adjacent to opposite ends thereof. Similarly, the separators 32' are each formed with a pair of slots 120 extending laterally inward through one side edge thereof adjacent to opposite separator ends. In addition, the separators 32' are each folded along a slot 121 with the fold extending laterally between opposite side edges and located medially between the ends of the respective separator.

Figure 9:
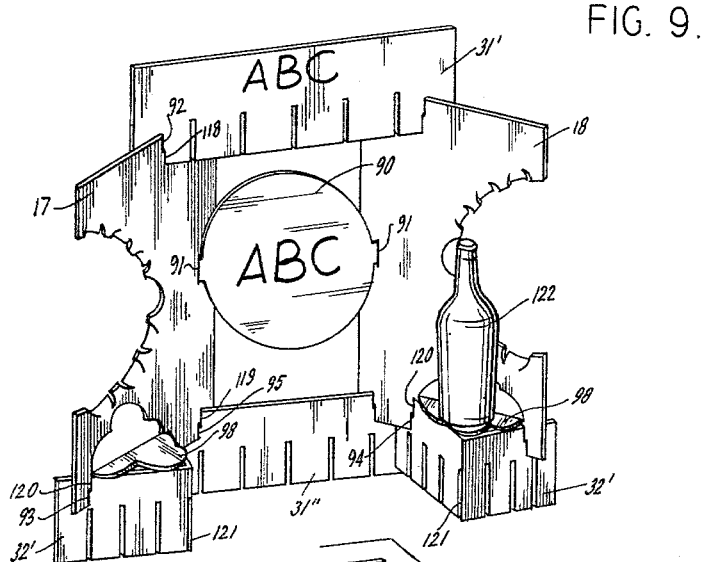
FIG. 9 is a perspective view showing the elements of FIG. 8 in assembled relation, and illustrating a bottle on display.

In the assembled condition of FIG. 9, the generally circular piece 90 is arranged between the separate remaining pieces of the panels 17 and 18, the panel pieces having their cut edges 89 laterally outermost. The hooks or tabs 88 of the piece 90 are respectively engageable in the slots 91 of the panel pieces 17 and 18, with the panel pieces extending obliquely forward and outward on opposite sides of the center piece 90. The separator 31 is then arranged over the panel pieces 17 and 18, extending laterally therebetween and having its slots 118 in respective interengagement with the slots 92 of the panel pieces. The separator 31'' is arranged beneath and extending laterially between the panel pieces 17 and 18 and arranged with its upwardly opening slot 119 in respective interfitting engagement with the downwardly opening slots 95 of the panel pieces. Also, each of the separators 32' is folded along its slot 121 and arranged adjacent to a respective panel piece 17 and 18 for interfitting engagement of its upwardly opening slots 120 with the downwardly opening slots 93 and 94 of the adjacent panel piece. The flaps 98 may now be swung forward and downward to rest on the upper edge of the respective adjacent separator 32', as for supporting a bottle 122.

In the embodiment of FIGS. 10 through 14, a showing such as in FIG. 1 has been omitted, as it may be substantially identical to the latter figure, excepting that the top pad may be single rather than double. Of course, corresponding numerals designate corresponding parts in the several embodiments.

Figure 10:
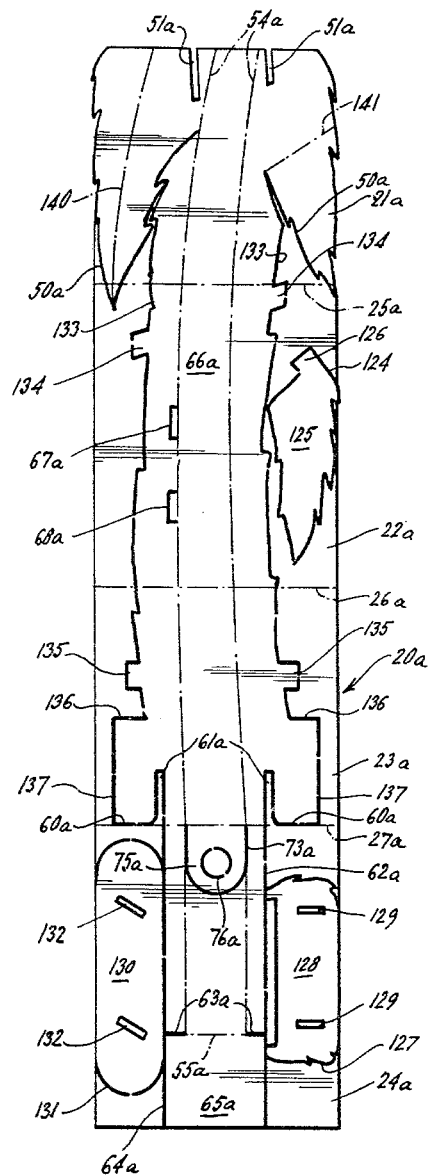
FIG. 10 is a plan view showing a modified form of liner constructed in accordance with the teachings of the present invention.

A liner 20a is shown in FIG. 10 including a plurality of end to end panels or sections 21a, 22a, 23a and 24a, hingedly connected together as by laterally extending or transverse fold lines 25a, 26a and 27a. The difference in proportions between the liner 20a and the hereinbefore described liner 20 may be attributed to the use with different size containers, as for different size and numbers of bottles. Section 22a of the liner 20a is formed with a severable cut 124 to define of the region therewithin a separable piece 125 having a tab or tongue 126. Further, the liner panel 24a may be formed with a severable cut 127 defining in the region therewithin a separable piece 128 of generally elongate configuration and having a pair of generally parallel closed slots 129 adjacent to its opposite ends. Similarly, an elongate piece 130 may be defined within the region of liner panel 24a bounded by a severable cut 131. The region 130 is preferably formed with a pair of closed slots 132 disposed in substantially parallel relation adjacent to opposite ends of the piece 130, and arranged at an oblique angle with the longitudinal dimension of the piece 130.

Extending generally longitudinally of the liner 20a, in slightly arcuate, substantial parallelism with each other, from the upper liner end, are a pair of fold lines 54a which pass through the panels 21a, 22a and 23a, intersecting with the fold lines 25a, 26a and 27a, and terminate short of the opposite, lower end of the liner 20a. A laterally disposed fold line 55a is formed in the liner panel 24a extending between the adjacent ends of the fold lines 54a. It will be observed in the instant embodiment, that the longitudinally extending fold lines 54a may be curved, if desired, as for simulating the trunk of a palm tree, or for other reasons.

Extending inward or downward from the upper end of the uppermost liner panel 21a, on opposite sides of the pair of fold lines 54a, are a pair of slots 51a. A pair of severable cuts 50a extend inward from opposite sides of the liner 20a, and thence downward on opposite sides of the pair of fold lines 54a, as at 133. The cuts 133 are configured to define one pair of laterally outstanding tabs or tongues 134 in the liner panel 22a, and an additional pair of laterally outstanding tabs or tongues 135 in the liner panel 23a. The external configuration of the cuts 133, apart from the tongues 134 and 135 may be such as to simulate the trunk of a palm tree, or otherwise, as desired. From beneath the lower tabs or tongues 135, the cuts 133 extend laterally outward, as at 136, and thence downward or longitudinally of the liner, as at 137 to the fold lines 27a. From the lower ends of cuts 137, laterally inward along the fold line 27a, extend cuts 60a, which are configured to define a pair of downwardly opening slots 61a on opposite sides of the pair of longitudinal fold lines 54a. Downward from the laterally inner sides of the slots 61a extend cuts 62, each of which includes a laterally inwardly extending branch cut 63a terminating at its inner end at the intersection of fold line 55a with the adjacent fold line 54a. The cuts 62a extend downward from the outer ends of the cuts 63a, as at 64a to the lower or distal end of the liner panel 24a. Thus, a generally rectangular region 55a of the lower end panel 24a is bounded within the fold line 55a, cuts 63a and 64a, and the lower end of the panel 24a to define an end flap swingable about the fold line 55a.

The upper liner panel 21a may be formed with an additional, generally longitudinally extending fold line 140 on one side of the pair of fold lines 54, while a transverse fold line 141 may be formed in the upper liner panel on the opposite side of the parallel longitudinal fold lines.

In the liner panel 22a, adjacent to and on the laterally outerside of one of the fold lines 54a, there may be formed a pair of vertically spaced, generally C-shaped cuts 67a and 68a. The lower liner panel 24a is formed with a generally U-shaped cut 73a having its legs extending upwardly coincident with respective longitudinal fold lines 54a and terminating at the transverse fold line 27a. Within the U-shaped cut 73a is located a generally circular cut 76a adapted to define an aperture upon severance. Thus, a flap 75a is formed by the cuts 73a, similar to the flap 75.

Figure 11:
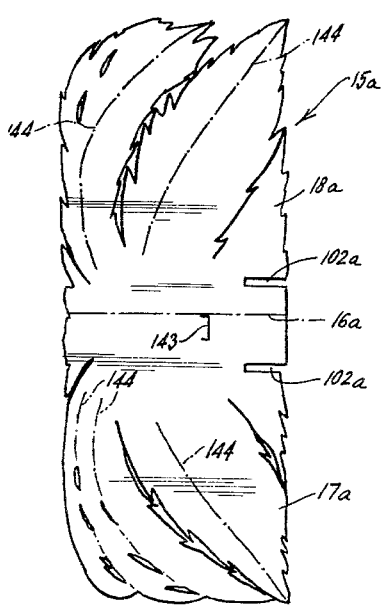
FIGS. 11 and 12 are modified forms of protecting pads constructed in accordance with the present invention and adapted to be employed in conjunction with the liner of FIG. 10.

A bottom pad 15a is shown in FIG. 11, and includes a pair of approximately equal size panels 17a and 18a, which may be configured according to the desired aesthetic effect. The panels are hingedly connected together by a fold line 16a, and are formed with a pair of slots 102a extending inwardly from an edge of each panel in substantial parallelism with and on opposite sides of the fold line 16a. In addition, a closed U-shaped slot 143 may be provided in one of the panels of bottom pad 15a, adjacent to the fold line 16a. Also, if desired, a plurality of fold lines 144 may be formed in the panel 17a and 18a, in the instant embodiment serving to permit folding for enhanced three-dimensional effects.

Figure 12:
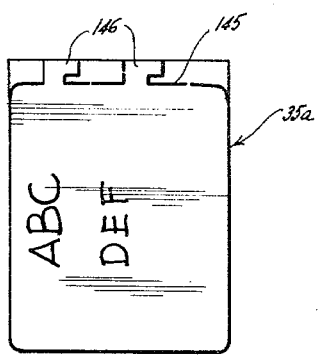

A top pad 35a is shown in FIG. 12 as a generally rectangular panel having a cut 145 formed therein so as to define a pair of attachment tabs or hooks 146 upon severance along the cut 145.

In FIG. 13 are shown the elements or pieces of the liner 20a, and the bottom pad 15a, all separate from each other, the bottom pad being cut away for conservation of drawing space. In particular, it will be observed that the pieces 128 and 130 have been separated from the liner panel 24a, while the piece 125 has been separated from the liner panel 22a, and the liner region within the cuts 50a, 133, 136, 137, 60a and 62a, has been separated from the remainder of the liner to define a separate piece 66a.

The elongate liner piece 66a is adapted to define an upstanding display or standard, see FIG. 13, with its lower end flap 65a swung forward for flat engagement with another supporting surface, and its flap 75a swung forward for receiving a bottle neck. The display piece or standard 66a is folded along the longitudinal fold lines 54a, so that the region between the longitudinal fold lines is forward, and the regions on opposite sides of the longitudinal fold lines extend obliquely rearward and outward. Thus, the fold lines 54a serve to longitudinally rigidify the display piece 66a. To maintain the display piece 66a in its rigidified, folded condition, the strap pieces 128 and 130 are each arranged to extend laterally behind the display standard, the former being inclined and receiving in its slots 129, the tabs 135 while the latter receives in its slots 132 the tabs 134.

For maximum three-dimensional visual effect, the display standard 66a may have its fold lines 140 and 141 bent, as illustrated. The bottom pad 15a is bent along its hinge or fold line 16a and arranged at the upper end of the display standard 66a with its slots 102a in interfitting engagement with the upper end slots 51a of the display standard. Also, as in FIG. 14, the several fold lines 144 of the bottom pad 15a may be bent for enhanced visual effect, and the separate piece 125 may have its tab 126 frictionally inserted through the slot 143 of the bottom pad in position on top of the display standard.

The top pad 35a may be positioned, as shown n FIG. 14, by resilient outward deflection of the cut regions 67a and 68a, and snug insertion of the attachment tabs or hooks 146 through the cut regions 67a and 68a. The display standard 66a is arranged with its downwardly opening slots 61a engaged over the upper edge region of a container side wall, as at 12a in FIG. 14, with the lower end flap 65a seated on the bottom wall 11a of the container, and a bottle 145 resting on the lower end flap and having its upper end or neck extending through the apertured flap 75a.

In the embodiment of FIGS. 15, 16 and 17, a liner is generally designated 20b, and includes end to end hingedly connected panels or sections 21b, 22b, 23b and 24b. The panels 21b through 24b are hingedly connected together by laterally extending fold lines 25b, 26b and 27b, wherein 27b is a severable cut. A longitudinally extending fold line 54b is formed in the liner 20b, extending from the upper end thereof to the cut 27b, spaced medially between the side edges of the liner, and intersecting with the fold lines 25b and 26b. On laterally opposite sides of the longitudinal fold line 54b, extending longitudinally inward from the upper end of the uppermost liner panel 21b, are formed a pair of slots 51b. Similarly, a pair of slots 61b are formed in the liner panel 23b extending generally longitudinally inward from the cut 27b, on opposite sides of the longitudinal fold line 54b. The slots 61b may diverge upward, as illustrated, if desired.

A protecting pad 15b is shown in FIG. 16 as including a pair of panels 17b and 18b of approximately equal size and area, and hingedly connected together by a fold line 16b. The panels 17b and 18b are each formed with a slot 102b extending upward through its lower edge adjacent to and on opposite sides of the fold line 16b.

In FIG. 16, the liner 20b has been severed along the cut 27b, and folded along the longitudinal fold line 54b, to define an upstanding display standard 66b. The lowermost panel 24b is now separate from the display standard 66b, and may be utilized in any desired manner, say as a sign, or humorous display card on the box 10b.

In FIG. 17, the display standard 66b is illustrated in its assembled relation with the pad 15b, the slots 102b of the pad being in interfitting engagement with the upwardly opening slots 51b of the display standard, and, the display standard is mounted on a container 10b by having the downwardly opening slots 61b receiving the upper edge region of a container wall 12b. The angularity of the slot 61b may be such as to afford a desired tilt to the display standard 66b.

In the additional embodiments of FIGS. 18 through 22, a liner is generally designated 20c, and includes a plurality of end to end panels 21c, 22c, 23c and 24c hingedly connected together by laterally extending fold lines 25c, 26c and 27c. The upper liner panel 31c is formed with a cut 150 of closed outline configuration and defining therewithin a sheet region 151 of generally crescent-like shape. Further, the crescent-shaped region 151 is formed with an angulate, three-sided slot 152, which may be considered as having a middle part 153, and a pair of side parts 154 extending in divergent relation from opposite ends of the middle part. In addition, the middle part 153 of the angulate slot 152 is cut to define a tab or tongue 155 extending generally in the direction toward the region between the side parts 154. The sheet region 151, is, of course, severable along the cut 150 for separation from the liner panel 21c.

The remaining liner panels, namely 22c, 23c and 24c are formed with a pair of longitudinally extending, generally parallel fold lines 54c which extend from the fold line 25c to the lower, distal end of the panel 24c, intersecting the fold lines 26c and 27c. A pair of severable cuts 50c extend from the intersection of the fold lines 40c with the fold line 25c, on laterally outer sides of the fold lines 54c, generally downward toward the fold line 26c. The cuts 50c are connected together at their upper ends by a cut 52c extending generally laterally between the longitudinal fold lines 54c, and intersect with the side edges of the liner panel 22c above the fold line 26c so that the panels 23c, 24c and that part of panel 22c below the cuts 50c are severable from the remainder of the liner to form a display standard 66c. The cuts 50c are each configured adjacent to their lower ends, as at 71c, to provide indented or notched formations in the side edges of the standard 66c.

In the space between the longitudinal fold lines 54c, above the notched formations 71c, there is formed a generally U-shaped cut 156 having a fold line 157 extending laterally between the ends of its legs and defining therewithin a flap 158. On one side of the longitudinal fold lines 54c, there are formed a pair of vertically spaced C-shaped cuts 57c and 58c, the former being in the liner panel 22c while the latter is located in the liner panel 23c. Further, an additional pair of vertically spaced generally C-shaped cuts 67c and 68c are formed on the opposite side of the pair of fold lines 54c, both in the liner panel 23c. Extending upward from the lower end of the lowermost liner panel 24c, on opposite sides of the longitudinal folds 54c, are a pair of slots 61c.

A protecting pad 15c is shown in FIG. 19, and provided with a plurality of closed configurations, severable cuts 160, 161, 162, 163 and 164. Each of the regions defined within one of the closed configuration cuts 160–164 is severable and separable from the remainder of the protecting pad 15c. In particular, the cuts 160 and 161 respectively define separable pieces 165 and 166 each having a pair of attachment tabs or hooks, as at 167 and 168.

In the condition of FIG. 20, it will be observed that the piece 151, and the display standard 66c have both been entirely separated from the liner 20c. Further, the display standard 66c has ben folded along its longitudinal fold lines 54c so that the region between the fold lines is forwardmost, while the regions on opposite sides of the fold lines extend obliquely rearward and outward. Also, the pieces 165 and 166 have been completely separated from the protecting pad 15c.

In the assembled condition of FIG. 21, the pieces 165 and 166 have been attached to the display standards 66c by resilient outward deflection of the cut regions 67c, 68c, 57c and 58c and snug engagement of the attachment tabs or hooks 167 and 168 in the cut regions. Also, the display standard 66c has been associated with and mounted on a container 10c by engagement of an upper edge region of a container wall 12c into the slots 61c.

The separate piece 151 has been placed over the upper end of the display standard 66c, and is in firm interfitting relation with the formations of the display standard.

Specifically, as seen in FIGS. 21 and 22, the upper end of the display standard 66c is engaged endwise through the slot 152 of the piece 151, until the distal ends of the slot regions 154 snap into the notched formations 71c, respectively, and the tab or tongue 155 engages in the opening formed by the C-shaped cut 156. The material within the C-shaped cut 156, defining the flap 158, is swung forward and upward about its hinged connection or fold line 157 and frictionally engages with the adjacent forward region of the piece 151 to retain the latter in its interfitting relation with the display standard.

In the embodiment of FIGS. 23 through 25, an enlongate container liner is generally designated 20d, which includes end to end panels or sections 21d, 22d, 23d and 24d hingedly connected together by fold lines 50d, 26d and 187. The line 50d is defined by a severable cut, and the liner 20d is formed in the section 22d with an additional transverse or laterally extending interrupted cut or weakened line 60d, both of which are adapted for severance to subdivide the liner into separate pieces. The cut 50d bounds the sections 21d and 22d, while the cut 60d is located in the liner section 22d, adjacent to and spaced from the fold line 187. A pair of laterally spaced cuts or slots 51d are formed in the liner section 22d spaced intermediate the fold lines 50d and 26d and located with one end of each slot at or coincident with the cut 60d and extending therefrom longitudinally of the liner away from the fold line 26d. Similarly, an additional pair of laterally spaced, longitudinally extending slots 61d are formed in the liner panel or section 22d extending from the cut 50d in the direction toward the cut 60d.

A pair of laterally spaced, generally longitudinally extending gold lines, scores or creases 54d may also be formed in the liner panel or section 22d, and may extend from the cuts 51d generally obliquely outward and toward the cuts 61d, terminating short of the latter, as illustrated. The liner panel or section 21d may be provided with suitable indicia or advertising matter, and is also formed with a pair of spaced slots 102d extending inward from one side edge of the panel.

Adjacent to the severance line 60d, and on the opposite side thereof as the slots 51d, the liner panel 22d is formed with a pair of laterally extending end to end aligned slots 195.

At the left of liner 20d as seen in FIG. 23 is a line 182, not part of the liner, but longitudinally coextensive therewith and subdivided by cross marks respectively designated 183, 184 and 185 located at the hinged connections 50d, 26d and 187d, respectively, of the liner, in order to facilitate visual clarity and understanding of the various fold lines.

Formed in the section or panel 23d of the liner 20d, medially between its hinged connections or fold lines 26d and 187, is a transverse or laterally extending fold line or score 186. A laterally extending or transverse fold line 188 is formed in the liner section 24d medially between the ends thereof. In addition, interrupted cuts or weakened lines of closed configuration, say circular, may be formed at 189, 190, 191 and 192. The cut 189 is located between fold 188 and the adjacent end of the liner, while the cut 190 is located between the fold lines 188 and 187, the cut 191 being located between the fold lines 187 and 186, and the cut 192 between the fold lines 186 and 26d. A pair of slots 193 and 194 are located to extend laterally inward from one side of the liner, the slot 193 extending laterally inward between the fold line 188 and the liner end, and the slot 194 extending laterally inward between the fold line 26d and the cut 60d. The slots 193 and 194 may incline slightly laterally inward and toward each other. Also, a pair of laterally extending hooks or tabs 181 are provided on the lower end of the liner, as seen in FIG. 23.

On the right-hand side of the liner 20d of FIG. 23 (not a part of the liner) is a longitudinally extending line 196 which terminates at its opposite ends at the slots 195, and the lower liner end, and is provided with cross marks 197, 198 and 199 respectively, located in alignment with the fold lines 186, 187 and 188.

The subdivisions of line 182 thus correspond to the panels or sections 21d, 22d, 23d and 24d of the liner; and, the subdivisions of line 196 correspond to wall sections 200, 201, 202 and 203, as will appear more fully hereinafter.

It is now apparent that the liner 20d is severable into three separate regions, the upper region 204 extending from the upper end of the liner downward to the cut 50d, an intermediate region 205 extending from the cut 50d to the cut 60d, and a lower region 206 extending from the cut 60d to the lower end of the liner. These regions in their separated conditions are shown in FIG. 24. The region 205 has been folded along the creases 54d for increased rigidity. It is now apparent that the slots 51d open upward through the upper end of the region 205, while the slots 61d open downward through the lower end of the region 205. In assembly, the region 206 is folded along its fold lines or creases 186, 187 and 188, to swing the sections 200, 201, 202 and 203 relative to each other into a closed, generally rectangular configuration, and the tabs 181 are engaged through the hook in the slots 195.

In the closed configuration, the region 206 may be placed on any suitable horizontal supporting surface to open upward therefrom. The liner region 205 is arranged in generally upstanding relation, and its downwardly opening slots 61d interengaged with the upwardly opening slots 193 and 194 of the region 206 to mount the region 206. As the slots 193 and 194 incline slightly, the standard region 205 may incline slightly backward. Of course, the slots 193 and 194 may be vertical to hold the region 205 vertical. Also, the region 204 may be arranged to interengage its slots 102d with the upwardly opening slots 51d of the region 205, whereby the latter region supports the region 204 in an elevated-display condition. This assembly is seen in FIG. 25.

It will be noted that bottled goods, as at 207 may be placed within the closed configuration of region 206, advantageously having their necks, extending through the apertures defined by cuts 189, 190, 191 and 192. This presents a visually appealing decorative effect, and serves to maintain the entire assembly firmly in position on a supporting surface.

It is, of course, appreciated that in the illustrations herein much of the various decorative embellishments and advertising indicia have been omitted, but that a wide variety of such are capable of being employed within the structural teachings of the present invention.

It is now understood that the present invention discloses a marketing device which fully accomplishes its intended objects, and is well adapted to meet practical conditions of manufacture, distribution and use, and that a multitude of variations in appearance of displays of the present invention is possible in accordance with the basic teachings herein.

Although the present invention has been described in some detail by way of illustration and example for purposes of clarity of understanding, it is understood that certain changes and modifications may be made within the spirit of the invention and scope of the appended claims.

What is claimed is:

1. A combination marketing and shipping device fabricated of stiff bendable sheet material and comprising a shipping container for containing goods in transit and on display, and an elongate protecting liner extending interiorly about the side walls of said container and being cut and scored to form a vertically elongate upstanding display standard upon its removal from said container, said liner also including a region severable therefrom and adapted for interengagement with the upper end of said display standard to be supported thereby and another severable region comprising a plurality of end-to-end swingable wall sections, the latter having interengageable formations at its opposite ends for retaining said last mentioned region in a closed-wall configuration for supporting said display standard and said region on removal from said container.

2. A combination marketing and shipping device fabricated of stiff bendable sheet material and comprising a shipping container for containing goods in transit and on display, and an elongate protecting liner extending interiorly about the side walls of said container and being cut and scored to form a vertically elongate upstanding display standard upon its removal from said container, said liner also including a region severable therefrom and adapted for interengagement with the upper end of said display standard to be supported thereby and another severable region comprising a plurality of end-to-end swingable wall sections, the latter having interengageable formations at its opposite ends for retaining said last mentioned region in a closed-wall configuration for supporting said display standard and said region on removal from said container, said display standard having inwardly extending slots at the opposite ends thereof for respective interengagement with said closed-wall configuration and said region.

3. A combination marketing and shipping device fabricated of stiff bendable sheet material and comprising a shipping container for containing goods in transit and on display, and an elongate protecting liner extending interiorly about the side walls of said container and being cut and scored to form a vertically elongate upstanding display standard upon its removal from said container, said liner also including a region severable therefrom and adapted for interengagement with the upper end of said display standard to be supported thereby and another severable region comprising a plurality of end-to-end swingable wall sections, the latter having interengageable formations at its opposite ends for retaining said last mentioned region in a closed-wall configuration for supporting said display standard and said region on removal from said container, said display standard being formed with at least one longitudinal fold line for increased vertical rigidity thereof.

4. A combination marketing and shipping device fabricated of stiff bendable sheet material and comprising a shipping container for containing goods in transit and on display, and an elongate protecting liner extending interiorly about the side walls of said container and being cut and scored to form a vertically elongate upstanding display standard upon its removal from said container, said liner also including a region severable therefrom and adapted for interengagement with the upper end of said display standard to be supported thereby and another severable region comprising a plurality of end-to-end swingable wall sections, the latter having interengageable formations at its opposite ends for retaining said last mentioned region in a closed-wall configuration for supporting said display standard and said region on removal from said container, said wall sections having removable portions which on removal define openings in said closed-wall configuration for the projection therethrough of the goods on display.

5. A marketing device fabricated of stiff bendable sheet material and comprising an elongate container liner severable into three interengageable regions, one of said regions being formed with a plurality of spaced, laterally extending fold lines subdividing said one region into a plurality of end-to-end swingable wall sections, the latter having interengageable formations at its opposite ends for retaining the same in a closed-wall configuration for supporting the other regions, another region forming a vertically elongate upstanding display standard having formations engageable with adjacent wall sections of said closed-wall configuration, and a third region forming an elevated display on interengagement with the upper end of said display standard to be supported thereby.

6. A marketing device fabricated of stiff bendable sheet material and comprising an elongate container liner, said liner being formed with a pair of spaced laterally extending severance lines to form three separable regions of said liner, one of said regions being formed with a plurality of spaced, laterally extending fold lines subdividing said one region into a plurality of end-to-end swingable wall sections, said one region being formed at its distal ends with cuts defining interengageable formations for retaining said one region with its sections swung to define a closed-wall configuration, another of said regions having formations at its opposite ends and being adapted for upstanding arrangement with the formations at its lower end in engagement with adjacent wall sections of said closed wall configuration, and the remaining one of said regions being adapted for engagement with the formations in the upper end of said other region to be supported thereby.

7. A marketing device according to claim 6, said formations of said other region being defined by slots extending inward from the lower and upper ends of said other region for respective interengagement with said closed-wall configuration and said remaining region.

8. A marketing device according to claim 6, said other region being formed with at least one longitudinally extending fold line to vertically rigidify said other region.

9. A marketing device according to claim 6, said one region being formed with cuts of closed configuration for removal of the portions within said cuts to define openings in said closed-wall configuration for receiving goods on display.

10. A marketing device fabricated of stiff bendable sheet material and comprising an elongated container liner severable into three interengageable regions, one of said regions being formed with a plurality of spaced, laterally extending fold lines subdividing said one region into a plurality of end-to-end swingable wall sections, the latter having interengageable formations at its opposite ends for retaining the same in a closed-wall configuration for supporting the other regions with said one region resting along a side edge thereof on a given supporting surface and with said wall sections extending upwardly from said surface and defining a given space which is surrounded by said wall sections, said one region being formed with cuts of closed configuration for removal of the portions within said cuts to define openings in said closed-wall configuration for receiving goods on display with part of said goods resting on said surface within the space surrounded by said one region and with other portions of said goods extending through said openings and resting on said one region in said openings thereof to increase the stability of said one region on said surface, said liner including another region forming a vertically elongated upstanding display standard having formations engageable with adjacent wall sections of said closed-wall configuration, and a third region forming an elevated display on interengagement with the upper end of said display standard to be supported thereby.

References Cited by the Examiner

UNITED STATES PATENTS

| | | |
|---|---|---|
| 1,296,158 | 3/19 | Bonham. |
| 2,249,881 | 7/41 | Bouchelle _____ 229—16 |
| 2,339,555 | 1/44 | Glass. |
| 2,723,026 | 11/55 | Paige _____ 206—45.12 |
| 2,833,397 | 5/58 | Boeye et al. _____ 206—45.14 |

THERON E. CONDON, *Primary Examiner.*